3,312,896
TRANSFORMER PHASE CONVERTER ADAPTED TO HAVE WATTMETER CURRENT TERMINALS CONNECTED IN SERIES WITH PRIMARY TO MEASURE TOTAL POWER SUPPLIED
Leroy B. Ronk, Nokomis, Ill., assignor to System Analyzer Corp., Nokomis, Ill., a corporation of Illinois
Filed Apr. 10, 1963, Ser. No. 272,025
9 Claims. (Cl. 324—107)

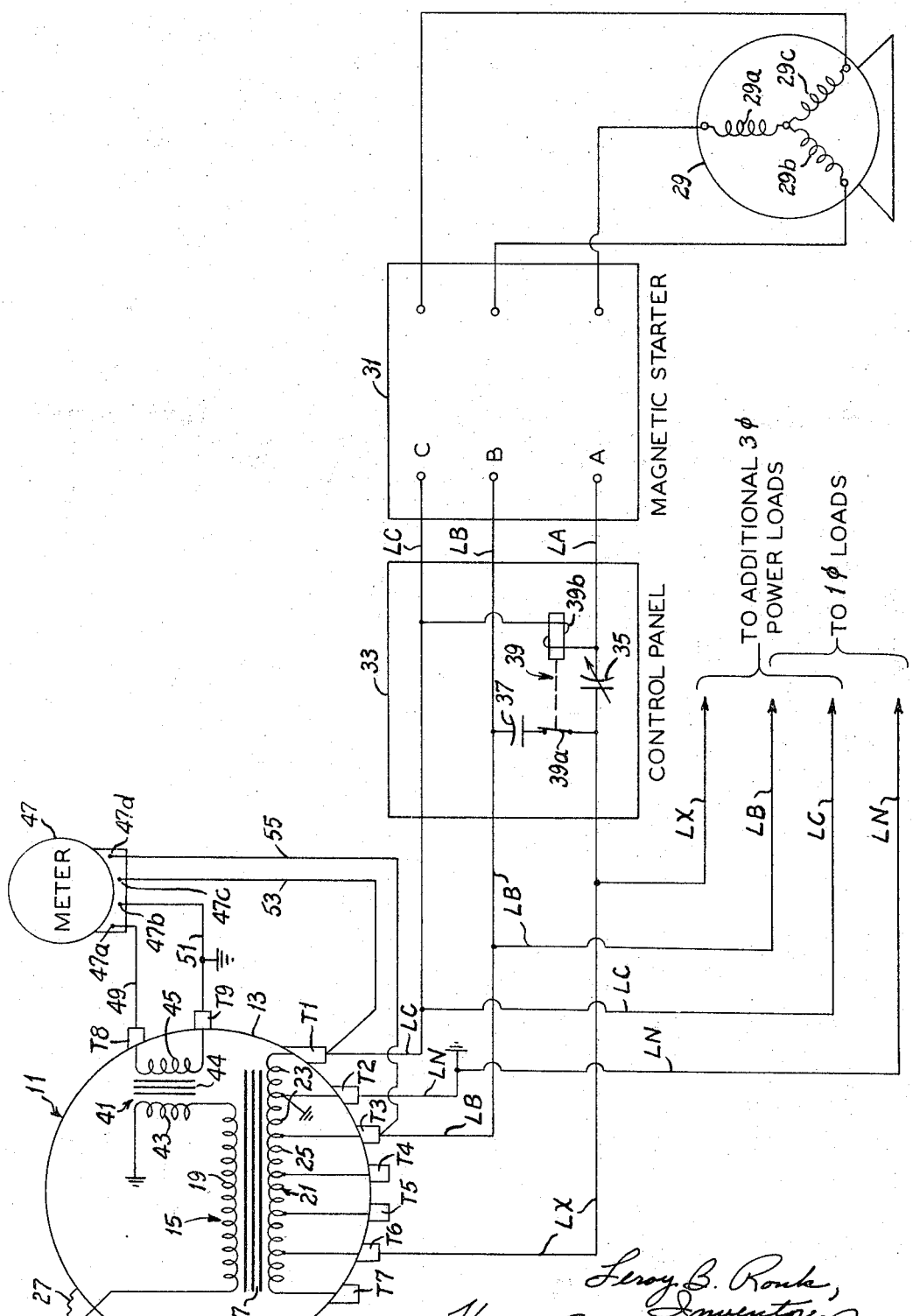

This invention relates to power tranfer apparatus, and more particularly to a system for converting single-phase high voltage electrical power to multiphase low voltage power.

Because of their increased efficiency and greater capacity, three-phase motors are generally preferred to single-phase motors, especially in industrial applications where large capacity motors are employed. In many areas, however, particularly in rural areas, three-phase power is not available. Phase convertors or phase conversion systems have been employed in these areas to convert low voltage single-phase power supplied, for example, by a single-phase distribution transformer to three-phase power and thereby permit the use of three-phase machinery. Typically, prior art systems of this kind include as an essential component one or more ratio or autotransformers to effect the phase conversion. These transformers are quite expensive and therefore add greatly to the overall expense of prior art phase conversion equipment. In accordance with this invention, power transfer apparatus is provided which includes, among other things, a novel distribution transformer that may be connected between a single-phase high voltage distribution system and the consumer's load devices. In addition to transforming the high voltage power to low voltage power, this distribution transformer also provides the functions heretofore performed by the ratio or autotransformers of prior art systems and accordingly eliminates the necessity of providing one or more separate transformers. This novel distribution transformer is not appreciably more expensive than conventional distribution transformers, and therefore it could be owned, installed, and maintained by the power distributor, for example the utility company serving the area, without substantially increasing the operating expenses of this distributor. This would substantially lessen the cost to consumers, and any added expense incurred by the utility company could be balanced against or offset by increased revenue derived from a resulting increased use of electric power in rural areas.

Accordingly, among the several objects of this invention may be noted the provision of power transfer apparatus which operates with increased efficiency to convert single-phase high voltage power to multiphase low voltage power; the provision of power tranfer apparatus including a novel single-phase distribution transformer which provides service to single-phase electrical loads, for example lighting loads, and to three-phase motor loads; the provision of apparatus of the class described wherein the amount of power or energy, both single-phase and three-phase, used by a consumer may be readily and accurately measured; the provision of a phase conversion system wherein the major portion of the system may be owned by and maintained under the supervision of a power distributor without greatly increasing the operating costs of the distributor; and the provision of a single-phase distribution transformer which, in addition to providing voltage transformation, also facilitates phase conversion. Other objects and features will be in part apparent and in part pointed out hereinafter.

Essentially the apparatus of this invention includes a novel distribution transformer having a tank, a primary winding within the tank, a center-tapped secondary winding inductively coupled with the primary winding, and an auxiliary winding within the tank inductively coupled with the primary winding and connected in series with the secondary winding. Means are provided for interconnecting the primary winding of the transformer with a primary line conductor of a power distribution system. Also provided are first, second, third and fourth secondary conductors interconnected with the secondary winding and the auxiliary winding. The first and second conductors are connected to respective ends of the secondary winding; the third conductor is connected to the center tap thereof; and the fourth conductor is connected to a point on the auxiliary winding remote from the secondary winding. The system further includes a phase-shifting impedance, for example a bank of oil capacitors, having one terminal connected to the fourth conductor and a second terminal connected to a fifth conductor. An electrical meter, for example a wattmeter or an integrating watthour meter, is provided having a pair of metering-current terminals and a pair of metering-potential terminals. Also provided is a current transformer having first and second windings, along with means connecting the first winding in series with the primary winding of the transformer. Finally included are means connecting the second winding of the current transformer across the metering-current terminals of the meter, and means connecting the first and second secondary conductors to the metering-potential terminals of the meter. The result is that the first, second and third conductors supply single-phase power, for example, for lighting loads; the first, second and fifth conductors supply three-phase power, for example, to motor loads; and the meter provides a measurement of the total amount of power supplied through the distribution transformer.

The invention accordingly comprises the constructions and circuits hereinafter described, the scope of the invention being indicated in the following claims.

In the accompanying drawing, the single figure illustrates schematically the electrical components of a preferred embodiment of this invention and their interconnection.

Referring now to the drawing, the invention is illustrated as including a distribution transformer 11 which comprises a tank 13 containing a dielectric fluid, for example transformer oil, and a core and coil unit 15. This unit in turn includes a core 17, a primary winding 19, and a low voltage winding 21 inductively coupled with primary winding 19. Winding 21 has a plurality of taps thereon connected to a plurality of low voltage bushings or terminals T1 through T7. The portion of winding 21 interconnected between bushings or terminals T1 and T3 constitutes a center-tapped secondary winding 23 which provides 115/230 volt single-phase service; while the remaining portion of winding 21 constitutes an auxiliary winding 25 connected in series with secondary winding 23. While it is preferred that one integral continuous winding form both the center-tapped secondary and the auxiliary windings as illustrated, it will be understood that separate low voltage windings could be employed provided they were both inductively coupled with primary winding 19 and electrically connected in series. A high voltage bushing for transformer 11, indicated at 27, is included to provide means for interconnecting primary winding 19 with a primary line conductor of a high voltage (e.g., 7620 volts) power distribution system. It will be assumed hereinafter that the primary distribution system to which the transformer 11 is connected is of the type wherein one side of the primary winding is connected to a single high voltage line conductor and the other side of the primary is connected to ground.

Three conductors LC, LB and LN are connected respectively to terminals or bushings T1, T3 and T2 and supply single-phase low voltage power to a consumer's single-phase loads, for example his lighting loads. The center tap of winding 23 is connected to ground (for example, to the transformer tank which is grounded), and conductor LN is grounded and constitutes the neutral conductor of the single-phase three-wire service. An additional conductor LX is connected to one of the taps of auxiliary winding 21 through a respective low voltage bushing. As explained hereinafter, the tap to which conductor LX is connected is determined by the characteristics of the three-phase load or loads being supplied. Conductor LX and conductors LB and LC are adapted, when employed in combination with a control panel having a phase-shifting impedance, to supply three-phase low voltage power to a consumer's three-phase loads, for example his power loads. In this latter connection, it will be assumed that a portion at least of the three-phase power load to be supplied is a three-phase motor 29 having windings 29a, 29b and 29c, and a conventional magnetic starter 31. It will be understood, however, that a consumer's three-phase load could consist of other different load devices, for example, three-phase rectifiers, etc. Also, while motor 29 is shown as comprising Y-connected windings, three-phase motors having delta-connected windings could, of course, constitute the three-phase load.

The system includes a control panel 33 inter-connected between conductors LX, LB and LC and the input terminals A, B, C of magnetic starter 31. This control panel or equipment in turn includes a phase-shifting impedance 35 connected between conductor LX and a conductor LA. The load on line LX is thus reactive and the current drawn from terminal T6 is shifted in phase with respect to that flowing in the secondary winding 23. Impedance 35 is illustrated as an adjustable capacitor; it may consist, for example, of a bank of parallel-connected oil-filled capacitors the taps of which are selectively interconnected to provide the proper capacitance value. Panel 33 also includes what will be referred to as a starting capacitor 37 selectively connected across conductors LB and LX by the contacts 39a of a starting relay 39. The latter includes a voltage sensitive coil or solenoid 39b interconnected between conductors LA and LC.

To provide an accurate determination or measurement of the total power or energy, both single-phase and three-phase, supplied through transformer 11, a novel metering arrangement is employed in the system illustrated. It will be appreciated that since the output of transformer 11 is both single-phase and three-phase, conventional metering arrangements (either single-phase or three-phase) would be incapable of providing a measurement of the power supplied through transformer 11. This is especially true of prior art metering arrangments which are responsive to or affected by changing load conditions, changing power factors, changing phase angles, etc.

The metering arrangement of the system is illustrated as comprising a current transformer 41 having a primary winding 43 connected in series with primary winding 19 between the latter and ground, a core 44, and a secondary winding 45 connected across two metering terminals or bushings T8 and T9. The arrangement also includes a conventional single-phase meter 47, for example an integrating watt-hour meter, having a pair of metering-current terminals 47a and 47b, and a pair of metering-potential terminals 47c and 47d. The former terminals are connected to bushings T8 and T9 by conductors 49 and 51, while the latter terminals are connected across bushings T1 and T3 by conductors 53 and 55 to obtain a representative voltage. Line 51 is connected to ground as indicated.

Since the current supplied at terminals 47a and 47b is directly proportional to and indicative of the current through primary winding 19, and since conductors LB and LC are commonly connected to single-phase loads and three-phase loads, the meter functions to indicate or register the total power or energy supplied to the consumer through transformer 11. Because of the low current in the primary winding 19, the primary winding 43 of current transformer 41 has several turns instead of the single primary turn or direct feedthrough common in conventional metering-type current transformers. This provides additional ampere turns in the primary 43 and greatly increases the accuracy of the energy determination since magnetizing currents, losses, etc., are not a significant portion of the ampere-turns in this primary. It will be understood that transformer 41 is a high voltage unit and must be designed to withstand the primary voltage of the single-phase distribution system. Moreover, this unit must have the same impulse level as the primary winding 19 so that it is not damaged by lightning and switching surges. Since meter 47 is directly interconnected with transformer 11, it could be conveniently mounted on the same pole as transformer 11, the connection between the two being made by low-amperage, low voltage conductors 49, 51, 53 and 55.

In operation or use of the system, the primary winding 19 is interconnected by bushing 27 to a high voltage line conductor of a distribution system. Single-phase loads, e.g. lighting loads, are connected across conductors LB, LC and LN in a usual or conventional manner. Three-phase motor loads are applied (through a respective control panel such as control panel 33) to conductors LX, LB and LC. Control panel 33, and more specifically phase-shifting impedance 35, shifts the phase of the voltage on conductor LX to provide a substantially balanced three-phase output on conductors LA, LB and LC.

Starting capacitor 37 is selectively connected between lines LB and LX by contacts 39a to compensate for the changing power factor characteristics which motor 29 exhibits during starting. As is common with inductive motors, the motor 29 will have a lower power factor during starting than when running at normal speed under rated load. To accommodate for this low power factor, and for the current inrushes encountered during starting, the capacitor 37 is normally connected by contacts 39a in shunt relation with the capacitive impedance 35 and the portion of the auxiliary winding 25 which is connected between taps T3 and T6. The size of capacitor 37 is selected so that under initial starting conditions the phase voltages and currents will be in substantial balance. As the motor speed increases this balance will be lost and the voltage across lines LA and LC will rise well above the rated phase voltage for the motor. Upon the occurrence of an imbalance sufficient to cause voltage sensitive relay 39 to open contacts 39a, capacitor 37 is removed from this circuit. Under running conditions, then, capacitor 35 is the only phase-shifting impedance employed in the circuit of panel 33. This capacitor is sized to provide the requisite phase shift during operation of motor 29 at rated speed under rated load; by proper selection of the size of this adjustable capacitor 35 and by selecting a proper tap or terminal on the auxiliary winding 25, balanced phase voltage and currents will be obtained for the particular load imposed by motor 29.

As explained above, meter 47 responds to the current in the secondary of transformer 41 and to the potential across terminals T1 and T3 to provide an accurate measurement or determination of the energy or power supplied to the consumer through distribution transformer 11.

It will be understood that many components essential to a consumer's electrical system, but which form no part of the present invention, have not been specifically disclosed or illustrated in the interest of clarity. For example, main panel boards or other switchgear, or other protective devices which would be interconnected between transformer 11 and the load devices to provide the requisite disconnect functions and overload protection have not been illustrated in the drawing. Also, it should be noted that additional conventional protective circuits could be employed within panel 33 if desired. While the invention is illustrated as being employed with a single conductor primary distribution system of the type used in rural areas, it will be understood that the system may be employed with a multiconductor system, in which case transformer 11 would be provided with two high voltage bushings. Moreover, it will be understood that current responsive units or fixed time controls may be used to selectively connect the capacitor 37 between LB and LX to maintain balance under varying three-phase load conditions.

In view of the foregoing, it is seen that the system of this invention provides three-phase low voltage power in areas served only by a single-phase high voltage distribution system. The system disclosed herein, and particularly the novel distribution transformer 11, eliminates the necessity of an expensive ratio transformer for each of a consumer's three-phase loads by combining the functions of these transformers and prior art distribution transformers into a single unit. Moreover, while transformer 11 may be somewhat more expensive than a corresponding conventional unit, it is not substantially so. The only added components are a current transformer (which in many instances would be required anyway), additional secondary taps or bushings, and an extension of the secondary winding. The extra cost involved is quite low in comparison to the savings to the consumer; and even if the distribution transformer were supplied by a utility without extra charge to the consumer, any added expense incurred would undoubtedly be offset by increased revenue derived from the increased use of three-phase machinery in rural areas.

In view of the above, it will be seen that the several objects of the invention are achieved and other advantageous results attained.

As various changes could be made in the above constructions and circuits without departing from the scope of the invention, it is intended that all matter contained in the above description or shown in the accompanying drawing shall be interpreted as illustrative and not in a limiting sense.

What is claimed is:

1. Power transfer apparatus for converting single-phase high voltage power to multiphase low voltage power, said apparatus comprising a distribution transformer having a tank, a primary winding within said tank, a center-tapped secondary winding within said tank inductively coupled with said primary winding, and an auxiliary winding within said tank inductively coupled with said primary winding and connected in series with said secondary winding, means interconnecting said primary winding with a primary line conductor of a power distribution system, first, second, third and fourth secondary conductors interconnected with said secondary winding and said auxiliary winding, said first and second conductors being connected to respective ends of said secondary winding, said third conductor being connected to the center tap of said secondary winding, and said fourth conductor being connected to a point on said auxiliary winding remote from said secondary winding, a phase-shifting impedance having two terminals, one of which is connected to said fourth conductor, the other being connected to a fifth conductor, an electrical meter having a pair of metering-current terminals and a pair of metering-potential terminals, a current transformer having first and second windings, means connecting said first winding in series with said primary winding, means connecting said second winding across the metering-current terminals of said meter, and a means connecting said first and second secondary conductors to the meter potential terminals of said meter, whereby said first, second and third conductors supply single-phase low voltage power, said first, second and fifth conductors supply three-phase low voltage power, and said electrical meter provides a measurement of the power supplied through said distribution transformer.

2. Power transfer apparatus as set forth in claim 1 wherein said secondary winding and said auxiliary winding are formed from a single low voltage winding inductively coupled with said primary winding.

3. Power transfer apparatus as set forth in claim 1 wherein said phase-shifting impedance includes an adjustable capacitor having a capacitance which maintains the three-phase power supplied by said first, second and third conductors in substantial balance.

4. Power transfer apparatus as set forth in claim 3 further including a second capacitor, and means interconnected between said first and fifth conductors and responsive to the voltage therebetween for selectively connecting said second capacitance between said second and fourth conductors to maintain said substantial balance under varying three-phase load conditions.

5. Power transfer apparatus as set forth in claim 1 wherein the first winding of said current transformer includes a plurality of turns, and wherein said first winding is connected between said primary winding and ground.

6. Power transfer apparatus as set forth in claim 1 wherein said auxiliary winding includes a plurality of taps, and wherein said distribution transformer includes a plurality of terminals, one connected to each of said taps.

7. Power transfer apparatus as set forth in claim 1 further including a three-phase motor and a magnetic starter for said motor, said magnetic starter being interconnected between said first, second and fifth conductors and said motor.

8. In power transfer apparatus for converting single-phase high voltage power to multiphase low voltage power, said apparatus including an electrical meter having a pair of metering-current terminals and a pair of metering-potential terminals; a distribution transformer comprising a tank, a primary winding within said tank, means interconnecting said primary winding with a primary line conductor of a power distribution system, a center-tapped secondary winding within said tank inductively coupled with said primary winding, an auxiliary winding within said tank inductively coupled with said primary winding and connected in series with said secondary winding, first, second, third and fourth secondary conductors interconnected with said secondary winding and said auxiliary winding, said first and second conductors being connected to respective ends of said secondary winding, said third conductor being connected to the center tap of said secondary winding, and said fourth conductor being connected to a point on said auxiliary winding remote from said secondary winding, a current transformer within said tank having first and second windings, means connecting said first winding in series with said primary winding, means for connecting said second winding across the metering-current terminals of said meter, and means for connecting said first and second secondary conductors to the metering-potential terminals of said meter whereby said first, second and third conductors supply single-phase low voltage power, said first, second and fourth secondary conductors are adapted to provide three-phase low voltage power, and said electrical meter is adapted to provide a measurement of the amount of power supplied through said distribution transformer.

9. A distribution transformer comprising a tank, a primary winding within said tank, a center-tapped secondary winding within said tank inductively coupled with said primary winding, an auxiliary winding within said tank inductively coupled with said primary winding and connected in series with said secondary winding, a plurality of low voltage terminals, two of said terminals being interconnected with respective ends of said secondary winding, a third being interconnected with the center tap of said secondary winding and a fourth being connected to a point on said auxiliary winding remote from said secondary winding for providing to a reactive load a current shifted in phase with respect to the current flowing in said secondary winding, a current transformer within said tank having first and second windings, said first winding comprising a plurality of turns, said first winding being serially connected with said primary winding, a pair of metering terminals adapted for connection to a watthour meter for registering the total power supplied through said distribution transformer, and means interconnecting said second winding across said metering terminals whereby a current is provided at said metering terminals which, together with a representative voltage, is accurately indicative of the total power being supplied through said distribution transformer.

References Cited by the Examiner

UNITED STATES PATENTS

| 2,832,925 | 4/1958 | Koll | 321—51 X |
| 3,106,664 | 10/1963 | Keath | 307—17 X |

FOREIGN PATENTS

| 901,822 | 7/1962 | Great Britain. |

WALTER L. CARLSON, *Primary Examiner.*

J. J. MULROONEY, *Assistant Examiner.*